(12) United States Patent
Smith et al.

(10) Patent No.: US 6,565,064 B2
(45) Date of Patent: May 20, 2003

(54) MODEL-BASED POSITION CONTROL FOR A SOLENOID ACTUATED VALVE

(75) Inventors: James Craig Smith, Farmington Hills, MI (US); James F. Sinnamon, Birmingham, MI (US); Robert J. Ewalds, Schifflange (LU)

(73) Assignee: Delphi Technologies, Inc., Troy, MI (US)

( * ) Notice: Subject to any disclaimer, the term of this patent is extended or adjusted under 35 U.S.C. 154(b) by 150 days.

(21) Appl. No.: 09/813,940

(22) Filed: Mar. 21, 2001

(65) Prior Publication Data

US 2002/0134956 A1 Sep. 26, 2002

(51) Int. Cl.$^7$ .............................................. F16K 31/02
(52) U.S. Cl. ................................................ 251/129.04
(58) Field of Search ...................... 251/129.04, 129.15

(56) References Cited

U.S. PATENT DOCUMENTS

| | | | | |
|---|---|---|---|---|
| 3,699,989 A | * | 10/1972 | O'Connor et al. | 251/129.04 |
| 4,492,246 A | * | 1/1985 | Prescott et al. | 251/129.04 |
| 4,845,416 A | * | 7/1989 | Scholl et al. | 251/129.04 |
| 5,787,915 A | * | 8/1998 | Byers et al. | 251/129.04 |
| 6,276,385 B1 | * | 8/2001 | Gassman | 251/129.04 |
| 6,354,563 B1 | * | 3/2002 | Yoeda et al. | 251/129.04 |
| 6,427,971 B1 | * | 8/2002 | Kawabe et al. | 257/129.04 |

* cited by examiner

Primary Examiner—David A. Scherbel
Assistant Examiner—John Bastianelli
(74) Attorney, Agent, or Firm—Vincent A. Cichosz

(57) ABSTRACT

An improved position control for a solenoid actuated valve, wherein the solenoid is activated based on the combination of a feed-forward component based on a model of the steady state operation of the valve and a closed-loop feedback component that responds to changes in the commanded position and compensates for any inaccuracy in the steady state model. The method involves a valve characterization procedure in which the actual force generated by the solenoid is measured for various combinations of valve position and solenoid current, resulting in a table of coil current in terms of developed force and valve position. In operation, the model is used to estimate the solenoid force required to achieve the commanded valve position under steady state operating conditions, and a controller addresses the table to obtain a feed-forward coil current command as a function of the commanded valve position and the estimated solenoid force. The feed-forward command is combined with a closed-loop feedback coil current command, which in turn, is used to develop a corresponding PWM duty cycle, given the solenoid temperature and the magnitude of the supply voltage.

7 Claims, 2 Drawing Sheets

MODEL-BASED POSITION CONTROL FOR A SOLENOID ACTUATED VALVE

TECHNICAL FIELD

This invention relates to a position control for a solenoid actuated valve, and more particularly to a control including a model-based feed-forward control component.

BACKGROUND OF THE INVENTION

Solenoid actuated position control valves are used in a variety of automotive control applications, including exhaust gas recirculation for an internal combustion engine. The solenoid coil is typically energized with a fixed supply voltage that is pulse-width-modulated (PWM) to produce a desired coil current. The control may be either open-loop or closed-loop depending on the performance requirements of the particular application. Open-loop controls generally rely on empirically derived tables of commanded valve position vs. PWM duty cycle or coil current, while closed-loop controls utilize position feedback to adjust the PWM duty cycle or desired current based on a computed deviation of the detected valve position from the commanded valve position. Various combinations of open-loop and closed-loop controls have also been used.

While reasonably good results can be achieved with the above-described control techniques by carefully tailoring the various tables and control gains for a particular application, an extensive calibration effort is usually required, and the control particulars developed for one application are typically not readily usable in a different application. Accordingly, what is needed is a control that does not require extensive calibration effort, and that is capable of providing good position control performance in a variety of different applications.

SUMMARY OF THE INVENTION

The present invention is directed to an improved position control for a solenoid actuated valve, wherein the solenoid is activated based on the combination of a feed-forward component based on a model of the steady state operation of the valve and a closed-loop feedback component that responds to changes in the commanded position and compensates for any inaccuracy in the steady state model. The method involves a valve characterization procedure in which the actual force generated by the solenoid is measured for various combinations of valve position and solenoid current, resulting in a table of coil current in terms of developed force and valve position. In operation, the model is used to estimate the solenoid force required to achieve the commanded valve position under steady state operating conditions, and a controller addresses the table to obtain a feed-forward coil current command as a function of the commanded valve position and the estimated solenoid force. The feed-forward command is combined with a closed-loop feedback coil current command, which in turn, is used to develop a corresponding PWM duty cycle, given the solenoid temperature and the magnitude of the supply voltage.

Since the methodology of the present invention includes modeling the physical parameters of the valve, the resulting control is more precise than conventional controls that do not account for variations in the modeled parameters. Additionally, the calibration effort required for the control of the present invention is significantly reduced, and the modular nature of the control minimizes the re-design and re-calibration efforts occasioned by changes in overall system design.

DESCRIPTION OF THE PREFERRED EMBODIMENT

Figure 1:
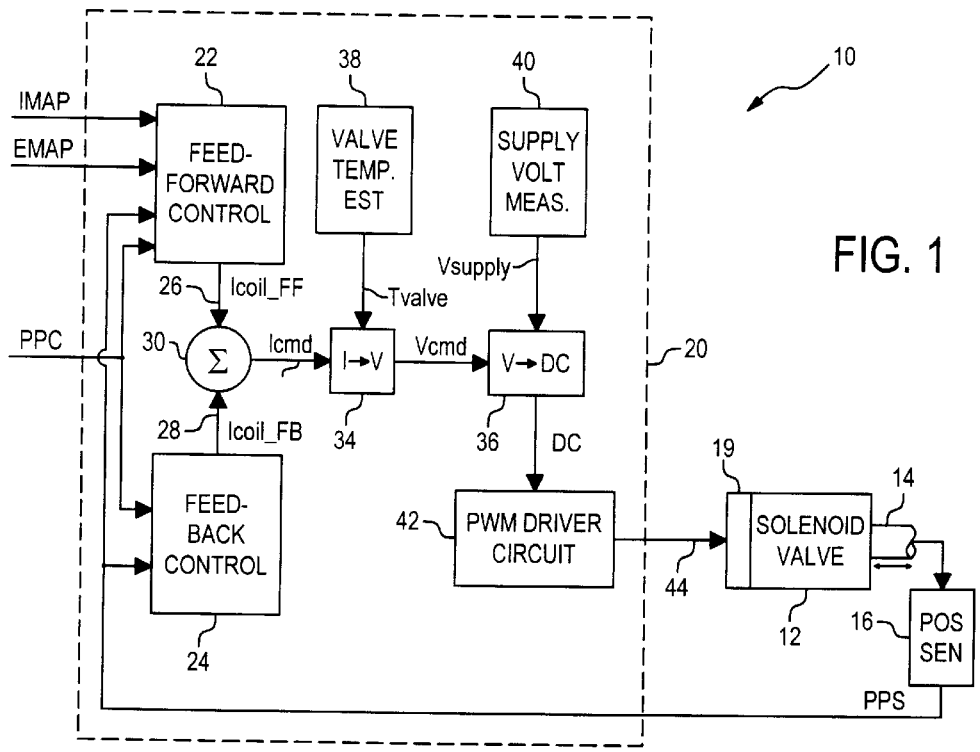
FIG. 1 is a block diagram of a solenoid valve position control according to this invention, in the context of an automotive EGR application.

Referring to FIG. 1, the reference numeral 10 generally designates a control system according to this invention for controlling a solenoid actuated valve 12. In the illustrated embodiment, the valve 12 is an exhaust gas recirculation (EGR) valve for an automotive internal combustion engine, and includes a pintle 14 that is linearly moveable as indicated to vary an opening in a passage connecting intake and exhaust manifolds of the engine (not shown). The desired amount of EGR is controlled by pintle position, and is denoted by a pintle position command PPC. The actual position of pintle 14 is detected by position sensor 16, which may be internal to the valve 12, and which develops a pintle position signal PPS on line 18 corresponding to the sensed position. A controller 20 comprising the elements 22, 24, 30, 34, 36, 38, 40 and 42 receives PPC and PPS signals, and activates a solenoid coil 19 within the valve 12 via line 44 so as to position the pintle 14 in accordance with the command PPC.

The controller 20 comprises a feed-forward control 22 and a feedback control 24, which are summed to form a current command Icmd for the coil 19 of solenoid valve 12. The feed-forward control 22 utilizes a steady state model of the valve 12, and develops a feed-forward current command Icoil_FF on line 26 based on PPC, PPS, and estimates or measures of the upstream and downstream pressures of the medium controlled by valve 12. In an EGR application, valve 12 controls the flow of exhaust gas from the exhaust manifold to the intake manifold; accordingly, the upstream pressure is the exhaust manifold absolute pressure EMAP, and the downstream pressure is the intake manifold absolute pressure IMAP. As mentioned above, the pressure values may be measured with suitable sensor devices, or estimated based on other available data. Further detail concerning the feed-forward control 22 is provided in FIGS. 2–4, described below. The feedback control 24 is a conventional closed-loop controller, such as a proportional or proportional-plus-integral controller, and develops a feedback current command Icoil_FB on line 28 based on a computed deviation of PPS from PPC. The feed-forward and feedback current commands Icoil_FF, Icoil_FB are combined in summer 30, forming the coil current command Icmd on line 32.

The current command Icmd is converted into a PWM duty cycle DC by the blocks 34, 36, 38, 40, and a conventional PWM driver circuit 42 pulse width modulates the solenoid coil 19 with the system supply voltage at the commanded duty cycle DC. The block 34 converts Icmd to a corresponding voltage command Vcmd, based on the solenoid coil temperature Tvalve provided by block 38, and the block 36 converts the voltage command Vcmd to a corresponding PWM duty cycle DC, based on the supply voltage magnitude provided by block 40.

The current to voltage conversion of block 34 is carried out by forming the product:

$$V_{cmd} = I_{cmd} * R_v * T_{valve} \quad (1)$$

where Rv is the nominal impedance of solenoid coil 19 at a standard temperature, and Tvalve is the temperature of valve 12, as mentioned above. The temperature Tvalve may be measured, but is preferably estimated based on a summation of heat flow quantities influencing the internal temperature of valve 12. The estimation may be expressed algebraically as:

$$T_{valve} = T_{valve}(0) + K_v \square (\Sigma Q') dt \quad (2)$$

where Tvalve(0) is an initial temperature of valve 12 (such as a measured ambient temperature at start-up after a prolonged soak), Kv is a heat capacity constant, and Q' represents various heat flow quantities, including a convective heat flow Qg' to valve 12 from the controlled exhaust gas, a conductive heat flow Qb' to valve 12 from the engine block, radiant and convective heat flows Qr', Qa' from valve 12 to the surrounding air, and a conductive electrical heat flow Qe' into valve 12 due to solenoid coil energization. These terms may be generally defined as follows:

$$Qg' = H_{gas} * M_g' * (T_{gas} - T_{valve}(last))$$

$$Qb' = H_{block} * (T_{block} - T_{valve}(last))$$

$$Qa' = H_{air} * (T_{air} - T_{valve}(last))$$

$$Qr' = \sigma * (T_{air}^4 - T_{valve}(last)^4) \quad (3)$$

where Hgas, Hblock and Hair are respective conduction coefficients for the exhaust gas, the engine block and air; Tgas, Tblock and Tair are respective temperatures of the exhaust gas, the engine block and air; Tvalve(last) is the previous estimate of Tvalve; and σ is a radiation coefficient. The electrical heat flow Qe' may be determined empirically for a given valve.

The voltage to duty cycle conversion of block 36 may be carried out based on the equation:

$$DC = 100 * (V_{cmd}/V_{supply})^2 \quad (4)$$

Figure 2:
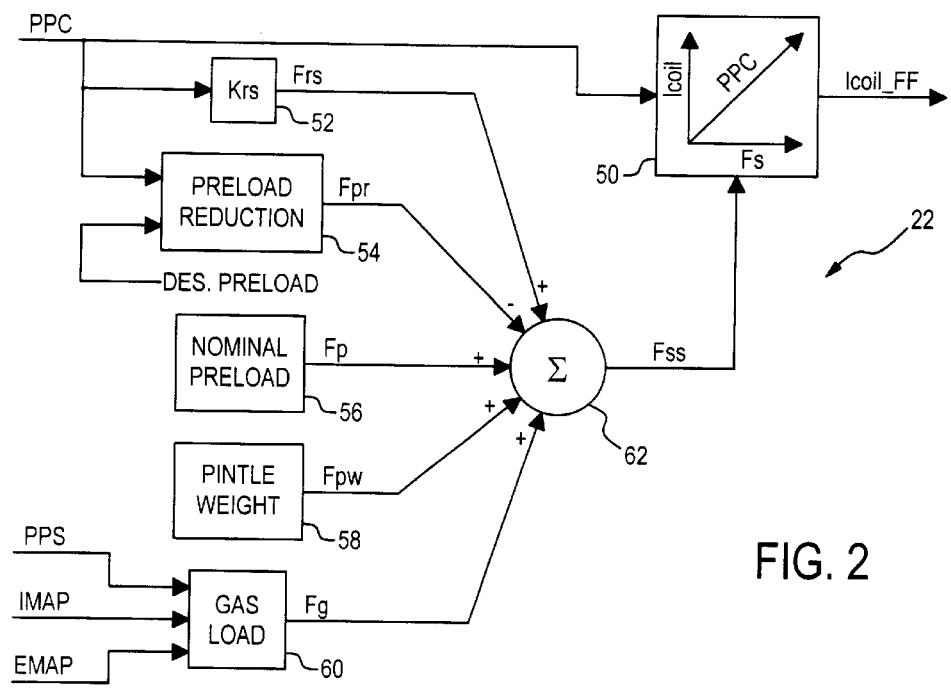
FIG. 2 is a block diagram detailing a feed-forward control block of the diagram of FIG. 1.
Figure 3:
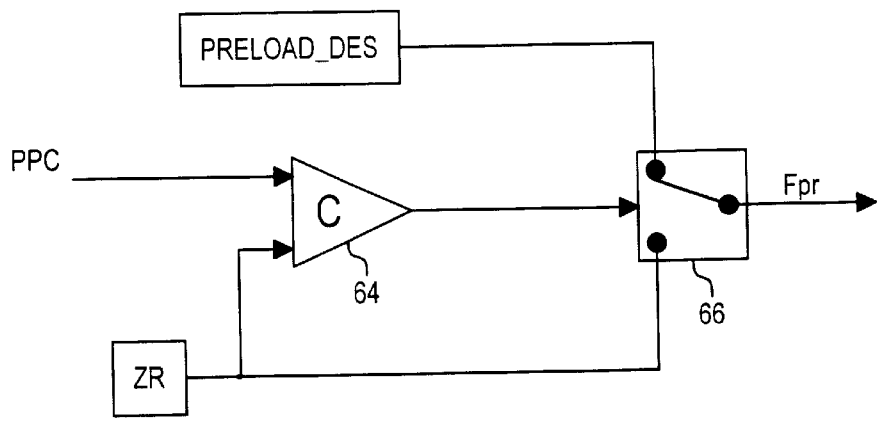
FIG. 3 is a block diagram detailing a closed-position pre-load reduction block of the diagram of FIG. 2.
Figure 4:
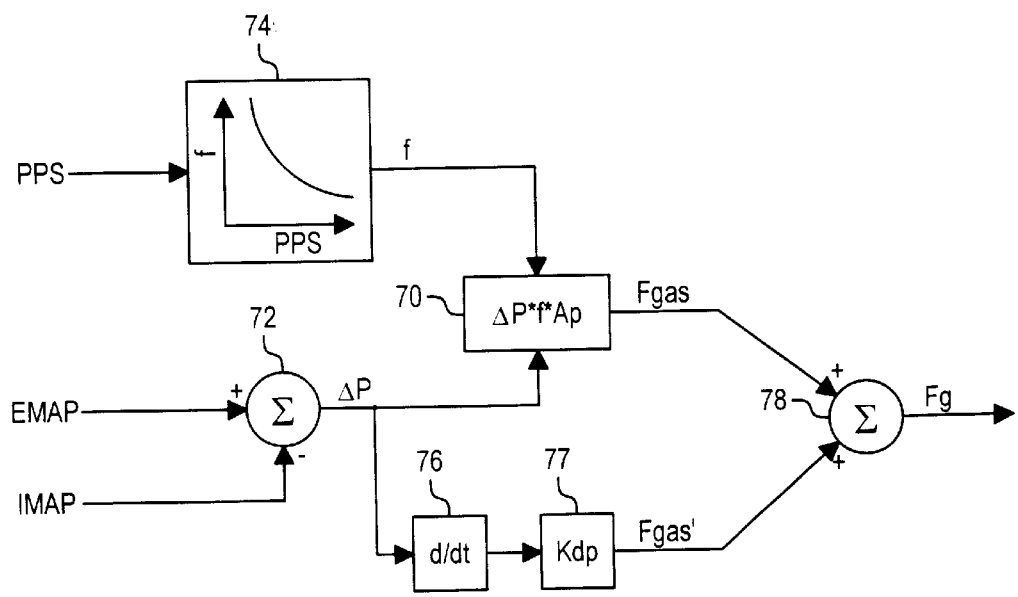
FIG. 4 is a block diagram detailing a gas load force block of the diagram of FIG. 2.

As indicated above, FIGS. 2–4 detail the feed-forward control 22 of FIG. 1. Essentially, the feed-forward control entails a valve characterization procedure and a model-based estimation of the steady state force Fss required to hold the pintle 14 at the commanded position PPC. The characterization procedure is carried out by recording the actual force applied to pintle 14 by solenoid coil 19 for various combinations of pintle position and solenoid current, and inverting the data to develop a table of coil current in terms of pintle position and the required steady state force, as depicted by the block 50 in FIG. 2. In operation, a steady state model, represented by the blocks 52, 54, 56, 68, 60 and 62, is used to estimate the solenoid force Fss required to achieve the commanded valve position PPC, and the feed-forward control 22 addresses the table 50 as a function Fss and PPC to obtain the corresponding feed-forward coil current command Icoil_FF.

The steady state model involves the summation of a number of component forces, including a return spring force Frs, a pre-load force Fp, a force due to pintle weight Fpw, and a gas load force Fg. Additionally, a preload reduction force Fpr may be used to reduce the closed-position spring pre-load, as explained below. The return spring force Frs is determined at block 52, and may be computed according to the product (PPC*Krs), where Krs is a spring constant of a return spring within valve 12 that biases the pintle 14 toward a closed position. In the illustrated embodiment, the term "closed position" refers to a position of pintle 14 that prevents the flow of exhaust gas into the engine intake manifold. The pre-load force Fp of block 56 is based on the design of valve 12, and represents a return spring force exerted on pintle 14 when in the closed position. The pre-load reduction force Fpr of block 54 works in conjunction with the pre-load force Fp, and is designed to reduce the modeled steady state force Fss by a desired pre-load amount Preload_des when PPC corresponds to a closed position of pintle 14. As shown in FIG. 3, PPC is compared to a zero reference ZR by comparator, which controls switch 66 such that Fpr is equal to Preload_des when PPC corresponds to a closed (zero) position of pintle 14, and zero otherwise. When a non-zero pintle position is commanded, the modeled steady state force Fss increases by Preload_des to facilitate initial movement of the pintle 14. The pintle weight force Fpw of block 58 is a fixed value for a given installation, and may be determined according to the equation:

$$F_{pw} = M_p * g * \sin(\theta) \quad (5)$$

where Mp is the mass of pintle 14, g is the gravitational acceleration, and θ is the angular orientation of the pintle 14 with respect to the horizontal. Finally, the gas load force Fg of block 60 refers to the net force exerted on pintle 14 by the controlled exhaust gases, and is determined as a function of PPS, IMAP and EMAP as indicated in FIG. 2. As shown more fully in FIG. 4, Fg is determined according to the sum of a static gas force Fgas and a dynamic modifier Fgas'. The static gas force is computed at block 70 according to the equation:

$$F_{gas} = \Delta P * f * A_p \quad (6)$$

where ΔP is the pressure differential (EMAP–IMAP), computed at block 72, f is a factor empirically determined at block 74 as a function of sensed pintle position PPS, and Ap is the pintle cross-sectional area on which the differential gas pressure acts. The dynamic modifier Fgas' is based on the derivative of ΔP as follows:

$$F_{gas}' = K_{dp} * d(\Delta P)/dt \quad (7)$$

where Kdp is a calibrated gain term. Thus, ΔP is applied to the derivative block 76, and the result is applied to the gain block 77 to form Fgas'. In the illustrated embodiment however, the exhaust manifold pressure EMAP changes very slowly, and the term d(ΔP)/dt may be approximated by d(EMAP)/dt, if desired. Finally, Fgas and Fgas' are summed at summation block 78 to form Fg.

In summary, the control of this invention provides a modular and model based position control for a solenoid actuated valve. The feed-forward component of the solenoid current command is based on a model of the parameters influencing the steady state forces acting on the valve and the closed-loop component provides a desired transient response and compensates for any inaccuracy in the steady state model. The resulting control is therefore more precise than conventional controls that fail to account for variations in the modeled parameters. Additionally, the required calibration effort is significantly reduced, and the modular nature of the control minimizes the redesign and re-calibration efforts required due to changes in overall system design. While the present invention has been described in reference to the illustrated embodiment, it is expected that various modifications in addition to those mentioned above will occur to those skilled in the art. Thus, it will be understood that controls incorporating these and other modifications may fall within the scope of this invention, which is defined by the appended claims.

What is claimed is:

1. A control for positioning a pintle of a solenoid actuated valve in accordance with a commanded position, comprising the steps of:
   measuring valve characterizing data including pintle force, valve position and solenoid current;
   forming a table of solenoid current in terms of valve position and pintle force using the measured valve characterizing data;
   during operation of the valve, modeling a steady state force required to hold the pintle at the commanded position;
   addressing the table based on the modeled steady state force and the commanded position to form a feed-forward solenoid current command for the valve;
   measuring an actual position of the pintle and determining a feedback solenoid current command for the valve based on a deviation of the actual position from the commanded position; and
   supplying a solenoid current to the valve according to a summation of said feed-forward and feedback solenoid current commands.

2. A control for positioning a pintle of a solenoid actuated valve in accordance with a commanded position, comprising the steps of:
   measuring valve characterizing data including pintle force, valve position and solenoid current;
   forming a table of solenoid current in terms of valve position and pintle force using the measured valve characterizing data;
   during operation of the valve, modeling a steady state force required to hold the pintle at the commanded position;
   addressing the table based on the modeled steady state force and the commanded position to form a feed-forward solenoid current command for the valve;
   measuring an actual position of the pintle and determining a feedback solenoid current command for the valve based on a deviation of the actual position from the commanded position;
   converting a summation of the feed-forward and feedback solenoid current commands to a voltage command based on a temperature of said solenoid actuated valve;
   converting the voltage command to a duty cycle based on a magnitude of a supply voltage for said solenoid actuated valve; and
   pulse-width-modulating said solenoid actuated valve with said supply voltage at said duty cycle.

3. The control of claim 1, wherein the step of modeling a steady state force required to hold the pintle at the commanded position includes the steps of:
   modeling a plurality of discrete force components acting on said pintle; and
   summing the discrete force components to form the modeled steady state force.

4. The control of claim 3, wherein the pintle is spring biased to a defined position, and the discrete force components include a spring force based on a position of said pintle, and a preload force corresponding to a spring force when said pintle is in said defined position.

5. The control of claim 4, including the step of:
   reducing the modeled steady state force by a predetermined amount when the commanded position is said defined position.

6. The control of claim 3, wherein the pintle is positioned to control passage of a compressible medium from a first vessel to a second vessel, and said discrete force components include a gas force corresponding to a force on said pintle due to a pressure differential between said first and second vessels.

7. The control of claim 6, wherein said gas force includes a static gas force component based on said pressure differential and a position of said pintle, and a dynamic gas force component based on a rate of change of said pressure differential with respect to time.

* * * * *